United States Patent
Tanner

(10) Patent No.: US 10,669,050 B2
(45) Date of Patent: Jun. 2, 2020

(54) TRANSPORT AND FEED UNIT FOR PREFORMS

(71) Applicant: M. TANNER AG, Illnau (CH)

(72) Inventor: Marcel Tanner, Bassersdorf (CH)

(73) Assignee: M. TANNER AG, Illnau (CH)

( * ) Notice: Subject to any disclaimer, the term of this patent is extended or adjusted under 35 U.S.C. 154(b) by 0 days.

(21) Appl. No.: 16/116,249

(22) Filed: Aug. 29, 2018

(65) Prior Publication Data
US 2019/0071194 A1    Mar. 7, 2019

(30) Foreign Application Priority Data
Sep. 7, 2017 (EP) ..................................... 17189934

(51) Int. Cl.
| | |
|---|---|
| B65B 3/02 | (2006.01) |
| B65G 47/68 | (2006.01) |
| B65G 21/22 | (2006.01) |
| B65G 47/14 | (2006.01) |
| B65G 15/08 | (2006.01) |
| B65G 47/51 | (2006.01) |
| B65G 47/44 | (2006.01) |

(Continued)

(52) U.S. Cl.
CPC .............. *B65B 3/022* (2013.01); *B65G 15/08* (2013.01); *B65G 21/22* (2013.01); *B65G 47/1492* (2013.01); *B65G 47/44* (2013.01); *B65G 47/5195* (2013.01); *B65G 47/684* (2013.01); *B29C 49/28* (2013.01); *B29C 49/4205* (2013.01); *B29C 49/4215* (2013.01); *B29C 2049/024* (2013.01); *B29K 2067/003* (2013.01); *B65G 2201/047* (2013.01)

(58) Field of Classification Search
CPC ....................................................... B65B 3/022
USPC ........................................................ 198/341.01
See application file for complete search history.

(56) References Cited

U.S. PATENT DOCUMENTS 5,270,000 A * 12/1993 Goldner .................. A61L 11/00
                                                                180/309
7,468,161 B2 * 12/2008 Reinhardt ................. B01L 9/52
                                                                 422/63
(Continued)

FOREIGN PATENT DOCUMENTS

| DE | 20308513 U1 | 7/2004 |
|---|---|---|
| DE | 102012101114 A1 | 8/2013 |

(Continued)

OTHER PUBLICATIONS

Extendeded European Search Report for corresponding European patent application No. EP 17189934.7, dated Feb. 28, 2018.

*Primary Examiner* — Gene O Crawford
*Assistant Examiner* — Lester Ill Rushin
(74) *Attorney, Agent, or Firm* — Notaro, Michalo & Zaccaria P.C.

(57) ABSTRACT

A transport and feed unit for preforms, in particular for PET bottles, in which the transport and feed unit can be charged with preforms at its upstream end and supplies the preforms to a conveyor unit arranged at the downstream end of the transport and feed unit. The transport and feed unit has a first conveyor and a second conveyor, in which at the downstream end of the first conveyor a funnel-like device is provided through which the preforms reach the second conveyor which supplies the preforms to the conveyor unit arranged at its downstream end.

10 Claims, 5 Drawing Sheets

(51) Int. Cl.
 *B29K 67/00* (2006.01)
 *B29C 49/42* (2006.01)
 *B29C 49/28* (2006.01)
 *B29C 49/02* (2006.01)

(56) References Cited

U.S. PATENT DOCUMENTS 8,757,363 B2 * 6/2014 Combs ................... B65G 43/10
 198/781.01
9,656,302 B2 * 5/2017 Hermle ................... B07C 5/363
2009/0090595 A1 4/2009 Cumbria et al.
2013/0019570 A1 * 1/2013 Weible ............... B29C 49/4205
 53/452

FOREIGN PATENT DOCUMENTS

| EP | 2578504 A1 | | 4/2013 | |
|---|---|---|---|---|
| GB | 2263472 A | | 7/1993 | |
| JP | 2017149517 A | | 8/2017 | |
| RU | 1799669 A1 | * | 3/1993 | ............ B22C 25/00 |
| WO | 2012126129 A1 | | 9/2012 | |

* cited by examiner

TRANSPORT AND FEED UNIT FOR PREFORMS

The invention relates to a transport and feed unit for preforms, in particular for PET bottles, in which the transport and feed unit can be charged with preforms at its upstream end and supplies the preforms to a conveyor unit arranged at the downstream end of the transport and feed unit.

DE 203 08 513 U1 discloses a device for supplying preforms made of thermoplastics with a carrier ring in the region of the open end to a blowing machine for the production of hollow bodies, having a silo installed close to floor level for the unsorted receiving of multiple preforms, a roller-sorter aligning the preforms in a position pointing upwards with the open end and forming a single row, an inclined conveyor moving the preforms from the silo to the roller-sorter in an unsorted manner and having a downwardly inclined chute exhibiting support rails engaging below the carrier rings, said chute receiving a plurality of preforms pointing upwards with the open end in a row and supplying these by means of gravitational force to the blowing machine, wherein the roller-sorter is installed close to floor level and an overhead conveyor lifting the preforms is inserted between the roller-sorter and the raised upper end of the chute. With this device, the silo is periodically filled from above by means of a corresponding tipping device by pouring preforms supplied in boxes.

The disadvantage of this solution is that the preforms can be damaged or scratched by the pouring action or impact with the silo and that a very high noise level is generated by this.

WO 2012/126129 A1 describes a device for charging a conveyor system with a large quantity of parts, such as preforms for hollow bodies, for example. The device in this case comprises a tipping device with a tiltable tipper part and a device for the intermediate storage of parts, wherein the device has a silo for intermediate storage with a removable cover and the tipping device has a mechanical connection and force-transfer element which is connected to the removable cover of the silo. This solution can also result in damage/scratches to the preforms due to the pouring action and also a greater noise level.

The problem addressed by the present invention is therefore that of providing a device by means of which the preforms can be supplied to a downstream module of a conveyor system in a careful and, where possible, quiet manner.

This problem is solved according to the invention by a transport and feed unit for preforms, in particular for PET bottles, wherein the transport and feed unit can be charged with preforms at its upstream end and supplies the preforms to a conveyor unit arranged at the downstream end of the transport and feed unit, wherein the transport and feed unit has a first conveyor and a second conveyor, wherein at the downstream end of the first conveyor a funnel-like device is provided through which the preforms reach the second conveyor which supplies the preforms to the conveyor unit arranged at its downstream end.

The transport and feed unit according to the invention does not therefore comprise the charging device connected upstream and also the conveyor unit connected downstream.

In a preferred embodiment of the invention, the funnel-like device tapers in the manner of a truncated pyramid and has a preferably perpendicular outlet. Through this geometric embodiment, the funnel-like device may act particularly effectively in the manner of a store or a buffer and transfer the preforms, which are supplied by the first conveyor, in a substantially continuous manner to the second conveyor (i.e. while the store preferably remains constantly between a minimum and a maximum filling level). The provision of the funnel-like device means that a further conveyor, which would otherwise be necessary to separate the delivery of preforms between the tipping device and the second (transverse) conveyor, can be dispensed with and a certain amount of space can therefore be saved.

In a further preferred embodiment of the present invention, in the region of the first conveyor at least two sensors (S1) and (S3), preferably at least three sensors (S1), (S2) and (S3), are provided for checking the presence or absence of preforms along the first conveyor. The sensor (S1) in this case is arranged in the starting region of the first conveyor and the sensor (S3) in the end region of the first conveyor; the sensor (S2) is preferably arranged in the middle region of the first conveyor (i.e. in the side wall above the first conveyor in each case). The sensors are preferably configured as light barriers and connected to a (customary) control.

If the sensor (S1) detects, for example, that there are no preforms present in the starting region of the first conveyor, the tipping device is activated in order to tip a new box of preforms onto the first conveyor.

It the sensor (S2) detects that no preforms are present in the middle region of the first conveyor, the drive of the first conveyor is activated and the belt speed increased. The same applies when the sensor (S3) detects that there are no preforms in the end region of the first conveyor.

In a further preferred embodiment of the present invention, in the region of the funnel-like device at least one maximum sensor (S5) and one minimum sensor (S6), and also preferably one overflow sensor (S4), are provided for checking the filling level with preforms. The sensors (S4), (S5) and (S6) are likewise connected to the control.

The overflow sensor (S4) is this case is arranged just above the funnel-like device. If the overflow sensor (S4) detects the presence of preforms in its region, the funnel-like device is overfilled (i.e. filled beyond the edge) and the first conveyor is switched off.

The maximum sensor (S5) is arranged just below the edge of the funnel-like device. If the maximum sensor (S5) detects the presence of preforms in its region (i.e. maximum filling level is reached), the speed of the first conveyor is reduced where necessary.

The minimum sensor (S6) is arranged at the lower end of the perpendicular outlet of the funnel-like device. If the minimum sensor (S6) no longer detects preforms in its region, the minimum filling level is not reached and a warning is triggered. Where necessary, the speed of the first conveyor is also increased and/or another box of preforms is tipped onto the first conveyor belt (i.e. depending on the display of sensors (S1), (S2) and (S3)).

When the filling level is between the maximum sensor (S5) and the minimum sensor (S6), substantially continuous operation prevails. This is the normal operation as intended. It is conceivable in principle for the sensor (S4) to be omitted.

In a further preferred embodiment of the present invention, at least one further sensor (S7) is provided in the region of the second conveyor for checking the presence or absence of preforms on the second conveyor, said sensor is likewise connected to the control. The sensor (S7) is arranged below the funnel-like device in a side wall of the second conveyor. If the sensor (S7) does not detect any preforms in its region and at the same time the sensor (S6) indicates the presence of preforms, a bridging between the second conveyor and the funnel-like device or the perpendicular shaft may have taken place and there is a blockage. An alarm signal is then produced and the blockage has to be removed manually by an operator.

In a further preferred embodiment of the present invention, the sensors (S1) to (S7) are configured as light barriers. In this way, the presence or absence of preforms in the respective region can be detected easily and reliably.

In a further preferred embodiment of the present invention, the first conveyor is configured as a soft belt. In this way, damage/scratches on the preforms produced during tipping onto the first conveyor are avoided and, in addition, noise can be reduced. The second (transverse) conveyor belt can also be configured accordingly as a soft belt. The soft belts are preferably produced from a soft plastics material or coated therewith.

In a further preferred embodiment of the present invention, the first conveyor and the second conveyor are arranged at right angles to one another. In this way, space can likewise be saved when installing the system.

In a further preferred embodiment of the present invention, one or a plurality of covers can be arranged above the first conveyor and above the funnel-like device. The covers are provided for reasons of hygiene and are intended to protect the preforms from dust and other particles. The covers in this case may have a folding and/or removable design.

In a further preferred embodiment of the present invention, an inclined surface is arranged at the upstream end of the first conveyor. The inclined surface is preferably made from plastics material and supports the charging of the first conveyor by the tipping device, i.e. no preforms are left in front of the first conveyor.

A further inclined surface is preferably provided at the interface between the first conveyor and the funnel-like device. This inclined surface is also preferably made of plastic and ensures that no preforms get caught here.

In a further preferred embodiment of the present invention, the first conveyor has a length L1 of between 1800 mm and 2200 mm, preferably of roughly 2000 mm. By using the funnel-like device according to the invention (or else the store), a relatively short first conveyor length is sufficient. In particular, no additional conveyor attached to the first conveyor is required in order to disperse the quantity of preforms sufficiently before the second (transverse) conveyor in the interests of the most continuous operation possible.

In the attached drawings, exemplary embodiments of the present invention are illustrated for the purposes of clarity.

Figure 1:
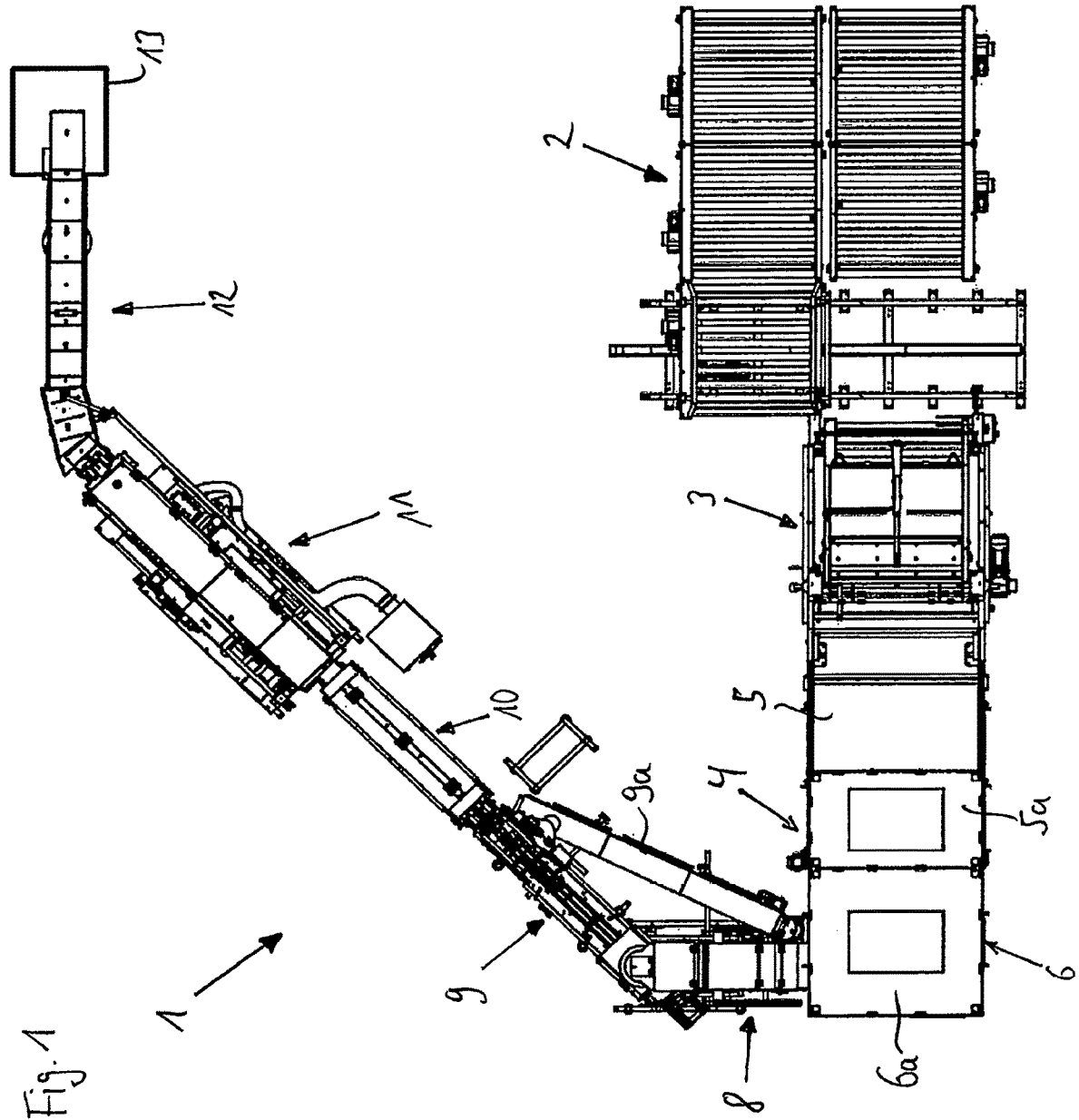
FIG. 1 shows a plan view of an exemplary conveyor system in which a transport and feed device according to the invention is integrated.

FIG. 1 shows an exemplary conveyor system 1 in which the transport and feed unit 4 according to the invention is integrated. A conveyor system 1 of this kind is provided, for example, in order to transfer preforms into a stretch blowing machine.

In this case, boxes of preforms are taken via the conveyor 2 to the tipping device 3 which receives a box and pours the contents, i.e. the preforms, onto the first conveyor 5 of the transport and feed unit 4 according to the invention.

The first conveyor 5 takes the preforms to the funnel-like device or store 6 (in this case, a cover 6a is arranged over the funnel-like device 6 and a cover 5a over the rear part of the first conveyor).

From there, the preforms reach the second conveyor 7 (in this case concealed by the funnel-like device 6 or else the cover 6a thereof) which passes the preforms to an overhead conveyor 8. A customary roller-sorter 9 with a feedback belt 9a is attached to the overhead conveyor 8.

Downstream of the roller-sorter 9 is provided a feed unit 10 which delivers the preforms to an infeed star-wheel of an inspection and ejector unit of a clamping conveyor 11, where the preforms are separated. Another outlet rail 12 via which the preforms are introduced into a stretch blowing machine 13 only indicated schematically here is attached to the clamping conveyor 11, for example.

Figure 2:
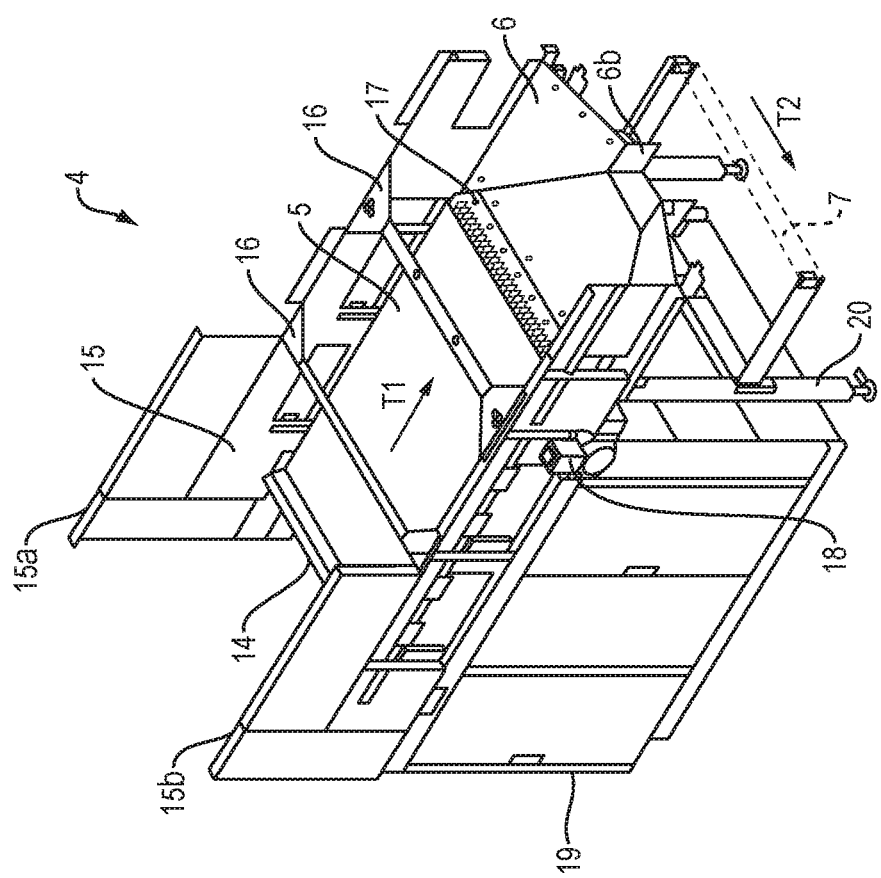
FIG. 2 shows a perspective view of the transport and feed device according to the invention.
Figure 5:
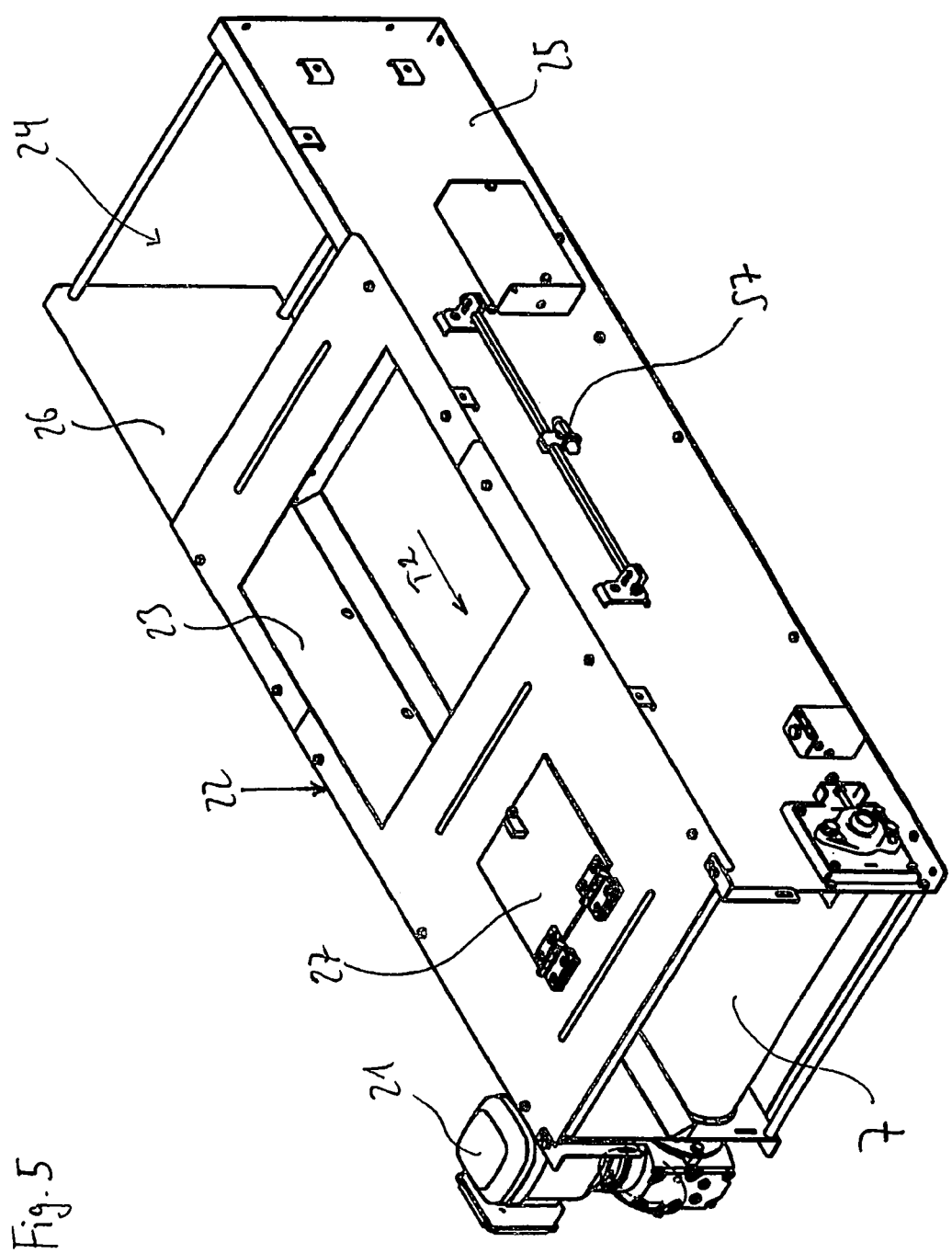
FIG. 5 shows a perspective view of the second conveyor belt (with housing) of the transport and feed unit according to the invention.

FIG. 2 shows a perspective view of the transport and feed unit 4 according to the invention, wherein the funnel-like device 6 is depicted as a partial section and wherein the second conveyor 7 is only indicated schematically (the second conveyor is described separately in FIG. 5).

The region with the raised side walls 15a, the grating parts 15b mounted on the side walls 15 and the inclined surface 14 at the upstream end of the first conveyor 5 should interact with the tipping device 3 shown in FIG. 1 in such a manner that when the first conveyor 5 is charged with the preforms, no preforms fall from the sides or get caught at the interface between the tipping device 3 and the first conveyor 5.

The drop height of the preforms from the tipping device 3 to the first conveyor 5, which is routinely designed as a soft belt, is preferably less than 100 mm in the case of the transport and feed device 4 according to the invention, which means that the preforms are not exposed to any damage/scratches due to the tipping action and the noise level can be kept down.

Following the pouring action, the preforms are moved by means of the first conveyor 5 in the transport direction T1 to the funnel-like device 6. The first conveyor 5 is driven by means of the drive 18 and supported by a frame 19. Mountings 16 for the covers 5a, 6a of the first conveyor 5 and the funnel-like device 6 shown in FIG. 1 extend between the side walls 15.

At the interface between the first conveyor 5 and the funnel-like device 6 an inclined surface 17 is in turn provided which ensures that the preforms do not get caught here. The preforms then reach the funnel-like device (or else the store) 6 which they begin to fill up after a given starting time and after a certain dwell time they leave again through the perpendicular outlet 6b (buffer or storage function) and fall onto the second conveyor 7.

The second conveyor 7 transports the preforms in the transport direction T2 (i.e. perpendicular to the transport direction T1) away from the overhead conveyor 8 shown in FIG. 1. The funnel-like device 6 is supported by a frame 20.

Figure 3:
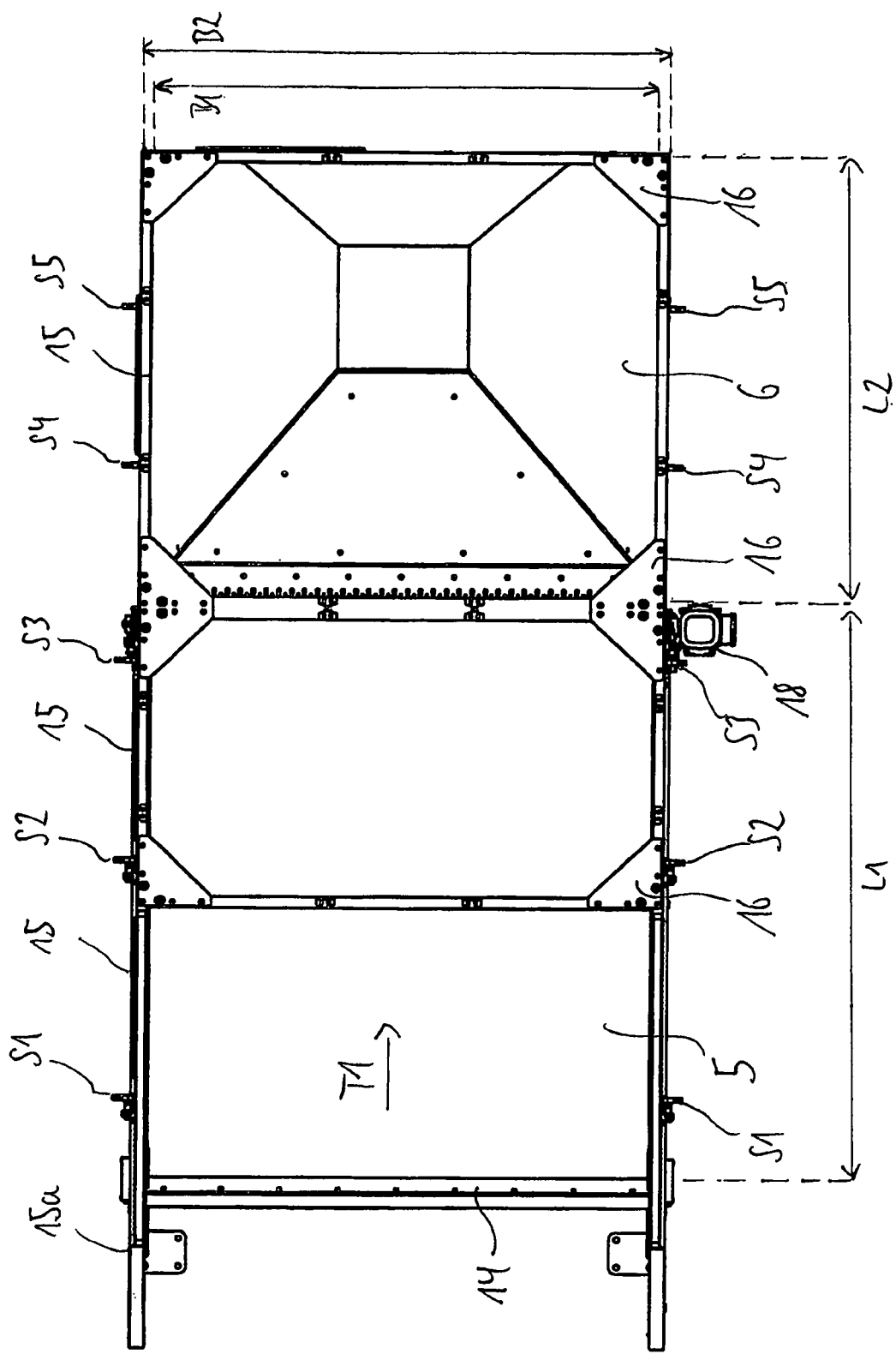
FIG. 3 shows a planar view of the transport and feed unit according to the invention, as shown in FIG. 2.

The arrangement of the sensors S1, S2 and S3 along the first conveyor 5 and also the operation thereof is described, in particular, with the help of FIG. 3.

As can be seen, sensor S1 is arranged in the starting region of the first conveyor 5, sensor S2 in the middle region of the first conveyor 5 and sensor S3 in the end region of the first conveyor 5 (i.e. above the first conveyor 5 in the side wall 15 in each case). The sensors S1, S2 and S3 are preferably configured as light barriers and are connected to a customary control (not shown).

If the sensor S1 detects that there are no preforms in the starting region of the first conveyor 5, the tipping device 3 is activated accordingly, in order to pour a new box of preforms onto the first conveyor 5.

If the sensor S2 detects that there are no preforms in the middle region of the first conveyor 5 (and the sensor S1 is occupied), the drive 18 of the first conveyor 5' is activated and the belt speed increased. The same applies when the sensor S3 detects that there are no preforms in the end region of the first conveyor 5 (and the sensor S1 and/or S2 is occupied).

Figure 4:
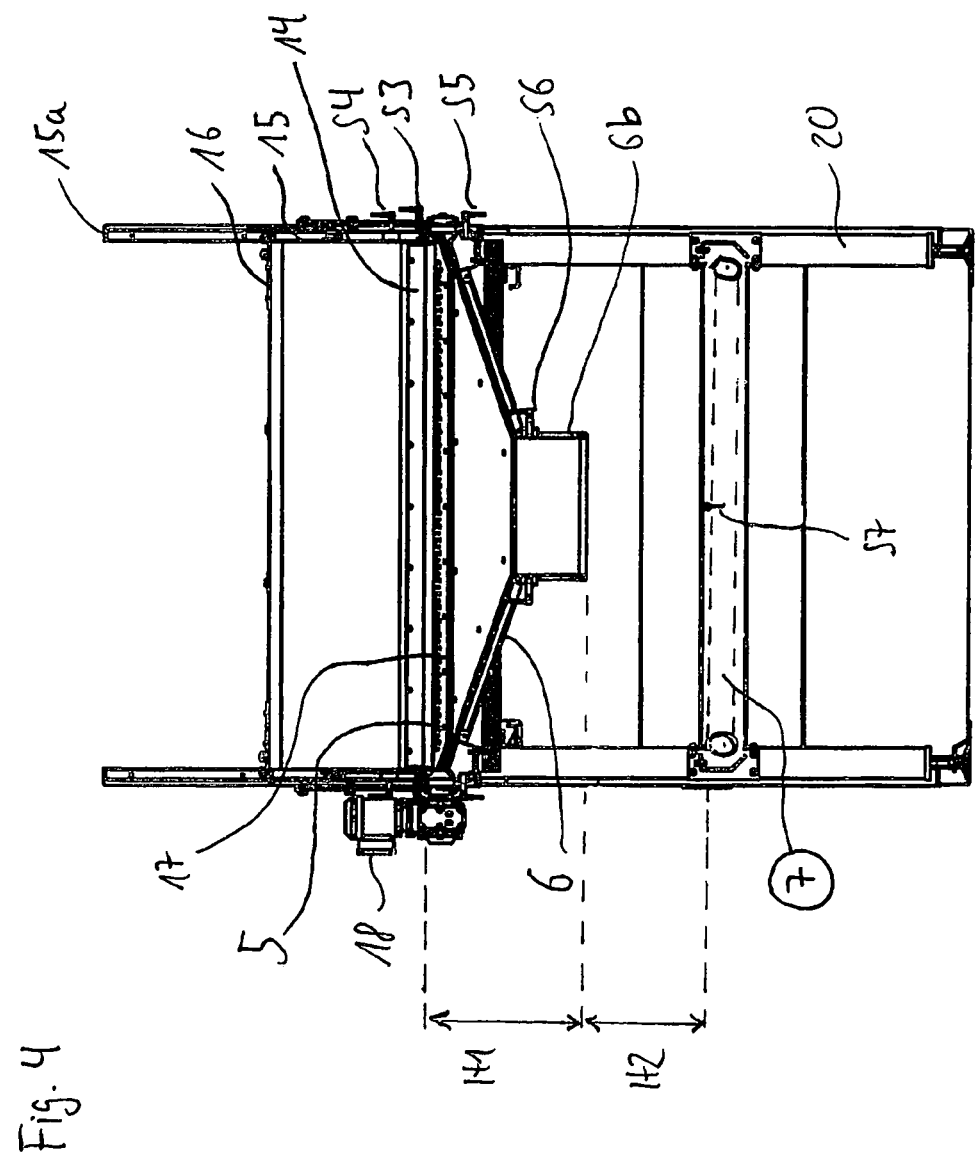
FIG. 4 shows a front view of the transport and feed unit according to the invention, as shown in FIG. 2.

Sensors S4 (overflow sensor) and S5 (maximum sensor) are arranged in the region of the funnel-like device 6, wherein the overflow sensor S4 is arranged close to the inclined surface 17 in the side wall 15, namely just above the upper edge of the inclined surface 14 (cf. FIG. 4).

The maximum sensor S5, viewed in the transport direction T1, is arranged a little after the overflow sensor S4, that is to say just below the lower edge of the inclined surface 17 (cf. FIG. 4).

The first conveyor belt 5 has a length L1 of 1500 mm to 2500 mm, preferably of roughly 2000 mm, and also a width B1 of roughly 1700 mm. The funnel-like device 6 has a length L2 of roughly 1660 mm and a width B2 of roughly 1720 mm.

The arrangement of the sensors S4, S5 and S6 in a vertical direction along the funnel-like device 6 and the perpendicular outlet 6b and also the operation thereof are explained with the help of FIG. 4.

The overflow sensor S4 is arranged in the side wall 15, namely slightly above the upper edge of the inclined surface 14, i.e. in particular also above the upper edge of the funnel-like device 6. The overflow sensor S4 indicates an overflow state of the funnel-like device 6.

The maximum sensor S5 is arranged on the underside of the funnel-like device 6, namely slightly below the lower edge of the inclined surface 17. The maximum sensor indicates a maximum filling level of the funnel-like device 6.

The minimum sensor S6 is arranged in the side wall of the perpendicular outlet 6b. The maximum sensor S6 indicates a minimum filling level of the funnel-like device 6.

The sensors S4, S5 and S6 are likewise connected to the customary control.

If the maximum sensor S5 detects the presence of preforms in its region (i.e. the maximum filling level has been reached), the speed of the first conveyor 5 is reduced where possible, as there may be a risk of overflow.

If, however, the overflow sensor S4 detects preforms in its region, despite everything, the funnel-like device 6 is overfilled (i.e. filled over the edge with preforms) and the first conveyor 5 is switched off.

If the first conveyor 5 has been switched off due to an overflow state detected by the sensor S4, there is preferably a delay until the filling state of the preforms has dropped back to below the maximum filling state before the first conveyor 5 is switched on again and new preforms are subsequently supplied.

If the minimum sensor S6 no longer detects preforms in its region, the minimum filling level is not reached and a warning is triggered. If necessary, the speed of the first conveyor 5 is increased and/or another box of preforms is tipped onto the first conveyor (i.e. depending on the display of sensors S1, S2 and S3).

When the filling level is between the maximum filling level (sensor S5) and the minimum filling level (sensor S6), substantially continuous operation of the transport and feed unit according to the invention prevails. This is then the normal operation as intended.

Below the funnel-like device 6 is arranged the second conveyor 7 which takes the preforms to the downstream conveyor unit 8 (cf. FIG. 1). The arrangement and operation of the sensor S7 is described below in connection with FIG. 5.

The height H1 from the lower edge of the perpendicular outlet 6b to the first conveyor belt 5 is between 240 mm and 320 mm, preferably roughly 280 mm. The height H2 from the second conveyor 7 to the lower edge of the perpendicular outlet 6b is less than roughly 300 mm, preferably less than 200 mm.

The second conveyor 7 with the housing 22 is described in FIG. 5. The second conveyor 7, as indicated above in FIG. 4, is mounted with the transport direction T2 perpendicular to the first conveyor 5 below the funnel-like device 6 or else the perpendicular outlet 6b. The upper housing opening 23 in this case is flush with the perpendicular outlet 6b.

The drive 21 of the second conveyor 7 is arranged at the downstream end of the rear side wall 26. On the upper side of the housing 22 a folding inspection and control window 27 is provided. The second conveyor 7 in the present case does not extend over the total length of the housing 22. The rear end region 24 of the housing 22 no longer comprises a belt portion; the upstream end of the second conveyor 7 is therefore routinely separated from the end region 24 by a flap.

In the front side wall 25, preferably in the region of the housing opening 23, a further sensor S7 is provided which is likewise configured in the form of a light barrier and is connected to the customary control.

The sensor S7 is used to check the presence or absence of preforms on the second conveyor belt. If the sensor S7 detects no preforms in its region and, at the same time, the sensor S6 indicates the presence of preforms, a bridging between the second conveyor belt and the funnel-like device or the perpendicular shaft may have taken place and there is a blockage. An alarm signal is then produced and the blockage has to be removed manually by an operator.

LIST OF REFERENCE NUMBERS

1 Conveyor system
2 Roller conveyor
3 Tipping device
4 Transport and feed unit
5 First conveyor
5a Cover
6 Funnel-like device (store)
6a Cover
6b Perpendicular outlet
7 Second conveyor
8 Overhead conveyor
9 Roller-sorter
9a Feedback belt 9a
10 Feed unit
11 Clamping conveyor
12 Feed rail
13 Stretch blowing machine
14 Inclined surface
15 Side wall
15a Raised side wall
15b Grating parts 16 Mountings for covers
17 Inclined surface
18 First conveyor drive
19 First conveyor frame
20 Funnel-like device frame
21 Second conveyor frame
22 Housing
23 Upper housing opening
24 End region
25 Front side wall
26 Rear side wall
27 Control window
H1 First conveyor—outlet lower edge height
H2 Outlet lower edge—second conveyor height
L1 First conveyor length
L2 Funnel-like device length
B1 Conveyor width
B2 Funnel-like device width
S1 First conveyor sensor (starting region)
S2 First conveyor sensor (middle region)
S3 First conveyor sensor (end region)
S4 Overflow sensor
S5 Maximum sensor
S6 Minimum sensor
S7 Second conveyor sensor
T1 First conveyor transport direction
T2 Second conveyor transport direction

The invention claimed is:

1. A transport and feed unit for preforms, in particular for PET bottles, which is designed to be connected to a conveyor unit (8) arranged at a downstream end of the transport and feed unit (4), wherein the transport and feed unit (4) can be charged with preforms at its upstream end and supply the preforms to the conveyor unit (8), wherein the transport and feed unit (4) has a first conveyor (5) and a second conveyor (7), and at the downstream end of the first conveyor (5) a funnel-like device (6) is provided through which the preforms reach the second conveyor (7) which supplies the preforms to the conveyor unit (8) arranged at its downstream end, wherein in the region of the first conveyor (5) two sensors (S1) and (S3) are provided for checking the presence or absence of preforms along the first conveyor (5) and in the region of the funnel-like device (6) one maximum sensor (S5) and one minimum sensor (S6), and also one overflow sensor (S4), are provided for checking the filling level with preforms.

2. The transport and feed unit as claimed in claim 1, wherein the funnel-like device (6) tapers in the manner of a truncated pyramid and has a preferably perpendicular outlet (6b).

3. The transport and feed unit as claimed in claim 1, wherein at least one further sensor (S7) is provided in the region of the second conveyor (7) for checking the presence or absence of preforms on the second conveyor (7).

4. The transport and feed unit as claimed in claim 1, wherein the sensors (S1)-(S7) are configured as light barriers.

5. The transport and feed unit as claimed in claim 1, wherein the first conveyor (5) is configured as a soft belt.

6. The transport and feed unit as claimed in claim 1, wherein the second conveyor (7) is configured as a soft belt.

7. The transport and feed unit as claimed in claim 1, wherein the first conveyor (5) and the second conveyor (7) are arranged at right angles to one another.

8. The transport and feed unit as claimed in claim 1, wherein one or a plurality of covers (5a, 6a) can be arranged above the first conveyor (5) and above the funnel-like device (6).

9. The transport and feed unit as claimed in claim 1, wherein an inclined surface (14) is arranged at the upstream end of the first conveyor (5).

10. The transport and feed unit as claimed in claim 1, wherein the first conveyor (5) has a length (L1) of between 1800 mm and 2200 mm, preferably of roughly 2000 mm.

* * * * *